Patented Oct. 2, 1945

2,385,802

UNITED STATES PATENT OFFICE 2,385,802

PROCESS FOR THE MANUFACTURE OF PLASTICS

John D. Ferry, Woods Hole, Mass., assignor to Research Corporation, New York, N. Y., a corporation of New York No Drawing. Application February 9, 1942, Serial No. 430,077

4 Claims. (Cl. 106—124)

The present invention relates to a novel plastic and to processes for the manufacture thereof, and has for its object the provision of improvements in products and processes of this nature.

Many plastics and rubberlike materials are water-resistant but are not resistant to hydrocarbons. I have found that proteins, which are constituted largely of polar groups, are well suited to the production of plastics which have an excellent resistance to non-polar solvents such as hydrocarbons, so that these plastics do not absorb or swell in oils or other petroleum fractions. Furthermore, unlike many rubberlike materials, proteins contain but few of the unsaturated bonds which are prone to oxidation and consequent deterioration.

Proteins of the type of albumin, however, are not well adapted to the manufacture of molded plastics. Plastics and molded resins made from blood albumin and similar materials tend to be brittle and do not have favorable molding qualities. It is frequently difficult to incorporate plasticizers with such proteins in more than small amounts. Products made from blood albumin and like materials dispersed in a substantial amount of plasticizer lack coherence and strength, probably because the globular molecules which are characteristic of this type of protein do not attract each other unless they are in close contact.

I have found fibrinogen, a protein made up of long chain molecules which are capable of interlocking and forming a coherent structure even when separated by a plasticizing medium, to be an admirable material for the manufacture of a novel plastic product.

Fibrinogen suitable for the manufacture of my improved plastic may be obtained from blood in various ways, of which the following is an example:

The corpuscles are first removed from the blood by centrifugation, clotting of the fibrinogen being prevented by the addition of citrates or like agents. The plasma remaining after the separation of the corpuscles may then be treated for the precipitation therefrom of commercial amounts of fibrinogen by cooling the same to 0° C. and adding thereto an alcohol such as ethanol, in amount sufficient to constitute 10% by volume of the plasma. The hydrogen ion concentration and the ionic strength of the plasma are also preferably adjusted. The pH of the solution may be controlled by the addition of acids or alkalis and the ionic strength by the addition of a salt, for example sodium chloride, ammonium sulfate, sodium sulfate, sodium, ammonium or potassium phosphate, acetate, carbonate or the like. Phosphates, acetates, carbonates or borates are particularly suitable salts because they have a buffer action and thus control both the ionic strength and the hydrogen ion concentration. For the precipitation of fibrinogen the pH may initially be adjusted in the neighborhood of 6.0 to 7.8. An ionic strength of 0.05 is adequate for effecting electrical discharge and flocculation; higher ionic strengths (e. g., 0.15 or more) are sometimes desirable for buffering.

Other precipitants and other procedures may be employed in obtaining fibrinogen from blood plasma, as more fully set forth in a copending application of Edwin J. Cohn, Ser. No. 430,401, filed February 9, 1942.

As stated in said copending application, the conditions selected for the fractionation depend upon the solubilities of the various protein components of the system and are determined by the five variables: temperature, pH, ionic strength, concentration of precipitant and concentration of the protein components. The latter factor is of most importance when the concentration of the various proteins in the system is high and diminishes in importance in dilute protein solutions. These effects of protein concentration often protect labile proteins from denaturation. The other four variables are important under all conditions and must always be under control if reproducible separations are to be carried out in protein systems. In sufficiently dilute protein solutions they alone suffice to define the separations.

Other precipitants include the water-miscible alcohols, such as methanol, butanol, etc., and the water-miscible acetones.

The precipitant may be added to the protein solution by diffusion through a semi-permeable membrane (for example, Cellophane) or it may be added directly to said solution. Fibrinogen has been precipitated from plasma by spraying the plasma into ethanol-water mixtures, or vice versa. A flowing junction has also been employed for this addition, by supplying ethanol-water mixtures through one end of the top of a T-shaped tube, and plasma through the other end of the top, the two solutions being thoroughly mixed and passing together down the stem of the T.

In an alternate procedure, any desired protein, for example fibrinogen, may be obtained by extraction from a solid protein mixture. Thus such a mixture of proteins may be precipitated simultaneously, the mixture dried and then a desired protein extracted therefrom and later reprecipitated.

The fibrinogen may be dried in various ways, for example by freezing and evaporation of the frozen liquid from the precipitate, or by washing with alcohol or other highly volatile liquid miscible with water and evaporation at room temperature or lower.

This procedure leaves the fibrinogen in a native, undenatured state and in the form of a light, dry, fluffy, voluminous powder which readily absorbs and retains liquid plasticizers, so that the plasticizers are not expelled under pressure.

For certain uses, fibrin may be used instead of fibrinogen in the manufacture of my novel plastic. Although fibrin plastics tend to be tough and leathery when the proportion of plasticizer is low and soft and weak when the proportion of plasticizer is high, freezing the fibrin and drying it from the frozen state will adapt it to some plastic uses.

The dry, finely-divided fibrinogen is mixed with a liquid plasticizer, for example glycerol, in the proportions of one part of fibrinogen to one-third to ten parts of plasticizer, together with other compounding ingredients which may be desirable for the purpose in view. The mixture is allowed to stand for two hours or longer and/or is milled on mixing rolls, forming a pasty or somewhat rubbery mass. This mass can be molded under pressure to any desired shape and can be cured by heat, for example a temperature of 100° C. for 15 to 45 minutes.

Among the plasticizing agents which may be used are glycerol, ethylene glycol and other polyhydric alcohols.

Hygroscopic salts, such for example as sodium thiocyanate, sodium iodide or calcium or barium thiocyanate or iodide, may advantageously be mixed with the protein. Sodium thiocyanate, for example, makes the plastic more firm and also more transparent and homogeneous.

Fillers and/or anti-oxidants may also be added to the mixture.

Depending upon the proportion of plasticizer, the time and temperature of heating and the presence of other ingredients, products of a wide variety of mechanical properties may be obtained, ranging from a soft, resilient, rubbery consistency, through a flexible consistency with slow retraction and shock-absorbing qualities, to a factice or resin-like consistency which is flexible for slow deformation but brittle on impact.

Higher temperatures and longer heating tend to produce a harder product.

Fibrinogen plastics soften upon soaking in water and their peculiar properties fit them for a variety of uses. For example, these products are adapted for use in surgery and medicine, as in plastic surgery, for replacing destroyed bones, as haemostatic agents, etc. The protein when used in surgery tends to be absorbed by the body in time, and this tendency may be controlled by suitable compounding procedures. For example, some plastics which contain glycerol as the plasticizer tend to disappear in animal bodies in a relatively shorter time than those in which the plasticizer is ethylene glycol.

The products and procedures disclosed above are by way of example only and various changes and modifications therein may be made, in keeping with the spirit of the invention as defined in the appended claims.

I claim:

1. A process for the manufacture of plastics which comprises as steps removing the corpuscles from blood while preventing clotting of the fibrinogen constituent, treating the resulting plasma for the precipitation of fibrinogen therefrom, drying the precipitated fibrinogen and mixing it with a plasticizer, molding the resulting mixture and setting the same by heat.

2. A process for the manufacture of a protein plastic which comprises as steps precipitating fibrinogen from blood plasma, shrinking and dehydrating the precipitated fibrinogen by washing with alcohol, drying the fibrinogen and mixing the same while in a finely divided condition with a liquid plasticizer to form a thermosetting plastic.

3. A process for the manufacture of a protein plastic which comprises as steps precipitating from blood plasma fibrinogen in the form of a light, fluffy, absorbent powder, mixing this fibrinogen with a plasticizer, molding the resulting product and setting the same by heat.

4. A process for the manufacture of plastics which comprises as steps removing the corpuscles from blood while preventing clotting of the fibrinogen constituent, treating the resulting plasma to precipitate therefrom fibrinogen in the form of a light, dry, fluffy, voluminous powder, mixing the precipitated fibrinogen with a polyhydric alcohol and molding and setting the resulting composition.

JOHN D. FERRY.

---

CERTIFICATE OF CORRECTION.

Patent No. 2,385,802.　　　　　　　　　　　　　　October 2, 1945.

JOHN D. FERRY.

It is hereby certified that error appears in the printed specification of the above numbered patent requiring correction as follows: Page 1, second column, line 17, for "Ser. No. 430,401" read --Ser. No. 430,075--; and that the said Letters Patent should be read with this correction therein that the same may conform to the record of the case in the Patent Office.

Signed and sealed this 1st day of January, A. D. 1946.

Leslie Frazer (Seal)　　　　　　　　　　　　　　First Assistant Commissioner of Patents.

such a mixture of proteins may be precipitated simultaneously, the mixture dried and then a desired protein extracted therefrom and later reprecipitated.

The fibrinogen may be dried in various ways, for example by freezing and evaporation of the frozen liquid from the precipitate, or by washing with alcohol or other highly volatile liquid miscible with water and evaporation at room temperature or lower.

This procedure leaves the fibrinogen in a native, undenatured state and in the form of a light, dry, fluffy, voluminous powder which readily absorbs and retains liquid plasticizers, so that the plasticizers are not expelled under pressure.

For certain uses, fibrin may be used instead of fibrinogen in the manufacture of my novel plastic. Although fibrin plastics tend to be tough and leathery when the proportion of plasticizer is low and soft and weak when the proportion of plasticizer is high, freezing the fibrin and drying it from the frozen state will adapt it to some plastic uses.

The dry, finely-divided fibrinogen is mixed with a liquid plasticizer, for example glycerol, in the proportions of one part of fibrinogen to one-third to ten parts of plasticizer, together with other compounding ingredients which may be desirable for the purpose in view. The mixture is allowed to stand for two hours or longer and/or is milled on mixing rolls, forming a pasty or somewhat rubbery mass. This mass can be molded under pressure to any desired shape and can be cured by heat, for example a temperature of 100° C. for 15 to 45 minutes.

Among the plasticizing agents which may be used are glycerol, ethylene glycol and other polyhydric alcohols.

Hygroscopic salts, such for example as sodium thiocyanate, sodium iodide or calcium or barium thiocyanate or iodide, may advantageously be mixed with the protein. Sodium thiocyanate, for example, makes the plastic more firm and also more transparent and homogeneous.

Fillers and/or anti-oxidants may also be added to the mixture.

Depending upon the proportion of plasticizer, the time and temperature of heating and the presence of other ingredients, products of a wide variety of mechanical properties may be obtained, ranging from a soft, resilient, rubbery consistency, through a flexible consistency with slow retraction and shock-absorbing qualities, to a factice or resin-like consistency which is flexible for slow deformation but brittle on impact.

Higher temperatures and longer heating tend to produce a harder product.

Fibrinogen plastics soften upon soaking in water and their peculiar properties fit them for a variety of uses. For example, these products are adapted for use in surgery and medicine, as in plastic surgery, for replacing destroyed bones, as haemostatic agents, etc. The protein when used in surgery tends to be absorbed by the body in time, and this tendency may be controlled by suitable compounding procedures. For example, some plastics which contain glycerol as the plasticizer tend to disappear in animal bodies in a relatively shorter time than those in which the plasticizer is ethylene glycol.

The products and procedures disclosed above are by way of example only and various changes and modifications therein may be made, in keeping with the spirit of the invention as defined in the appended claims.

I claim:

1. A process for the manufacture of plastics which comprises as steps removing the corpuscles from blood while preventing clotting of the fibrinogen constituent, treating the resulting plasma for the precipitation of fibrinogen therefrom, drying the precipitated fibrinogen and mixing it with a plasticizer, molding the resulting mixture and setting the same by heat.

2. A process for the manufacture of a protein plastic which comprises as steps precipitating fibrinogen from blood plasma, shrinking and dehydrating the precipitated fibrinogen by washing with alcohol, drying the fibrinogen and mixing the same while in a finely divided condition with a liquid plasticizer to form a thermosetting plastic.

3. A process for the manufacture of a protein plastic which comprises as steps precipitating from blood plasma fibrinogen in the form of a light, fluffy, absorbent powder, mixing this fibrinogen with a plasticizer, molding the resulting product and setting the same by heat.

4. A process for the manufacture of plastics which comprises as steps removing the corpuscles from blood while preventing clotting of the fibrinogen constituent, treating the resulting plasma to precipitate therefrom fibrinogen in the form of a light, dry, fluffy, voluminous powder, mixing the precipitated fibrinogen with a polyhydric alcohol and molding and setting the resulting composition.

JOHN D. FERRY.

---

CERTIFICATE OF CORRECTION.

Patent No. 2,385,802.            October 2, 1945.

JOHN D. FERRY.

It is hereby certified that error appears in the printed specification of the above numbered patent requiring correction as follows: Page 1, second column, line 17, for "Ser. No. 430,401" read --Ser. No. 430,075--; and that the said Letters Patent should be read with this correction therein that the same may conform to the record of the case in the Patent Office.

Signed and sealed this 1st day of January, A. D. 1946.

Leslie Frazer (Seal)            First Assistant Commissioner of Patents.